Figure 8:
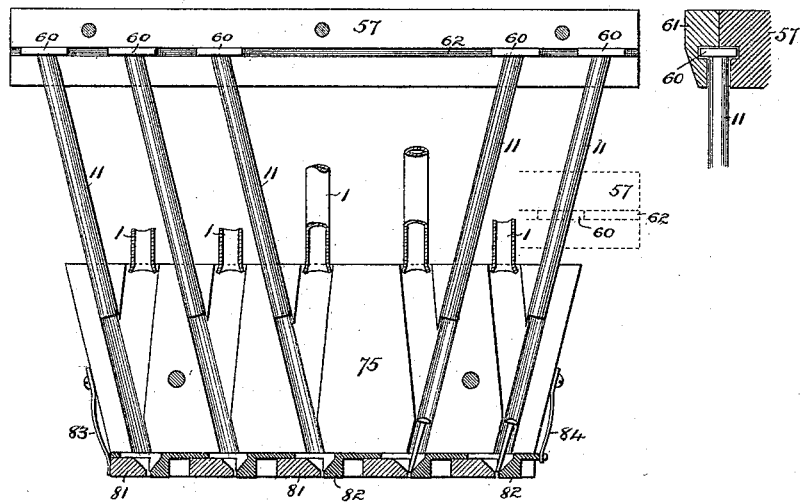

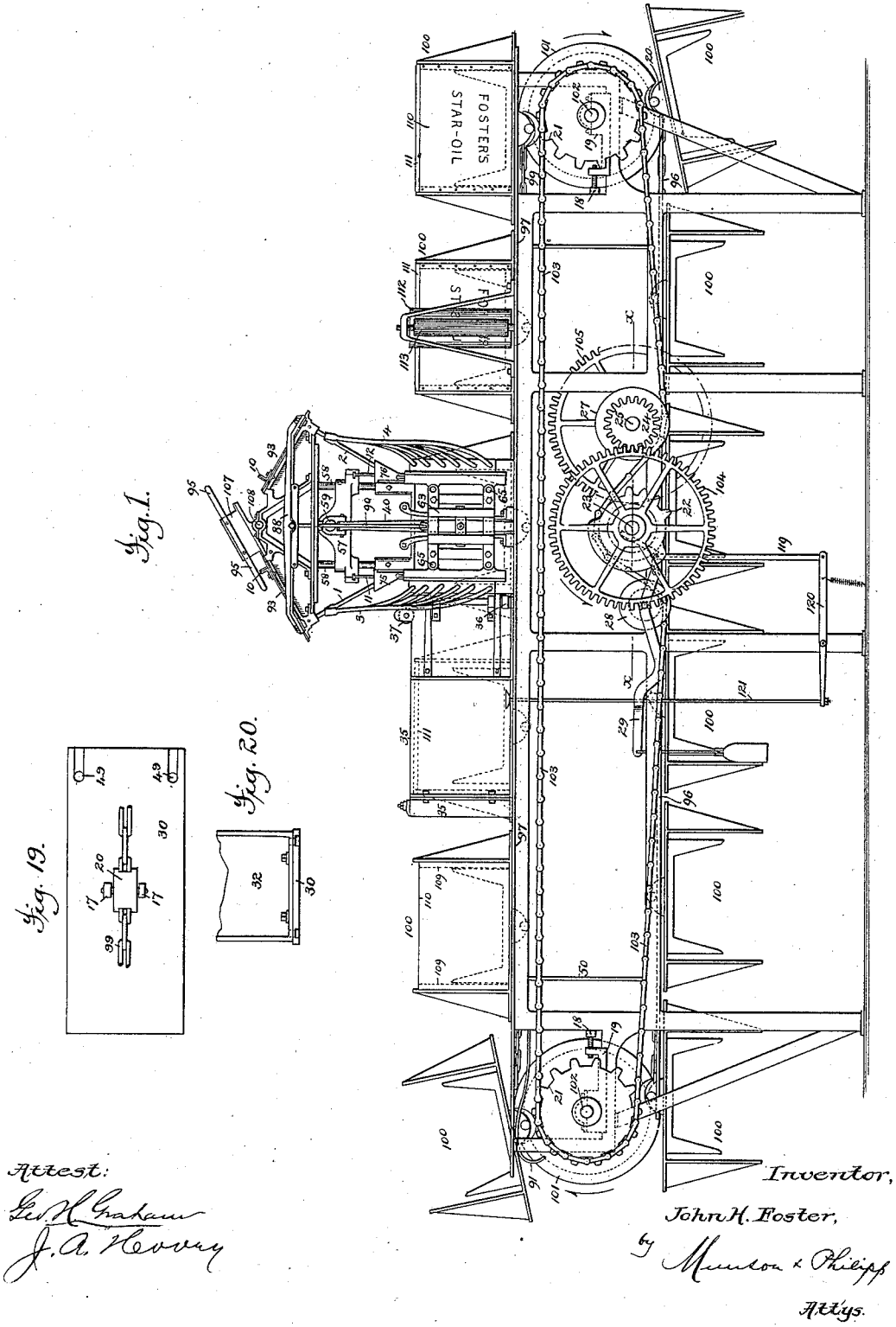

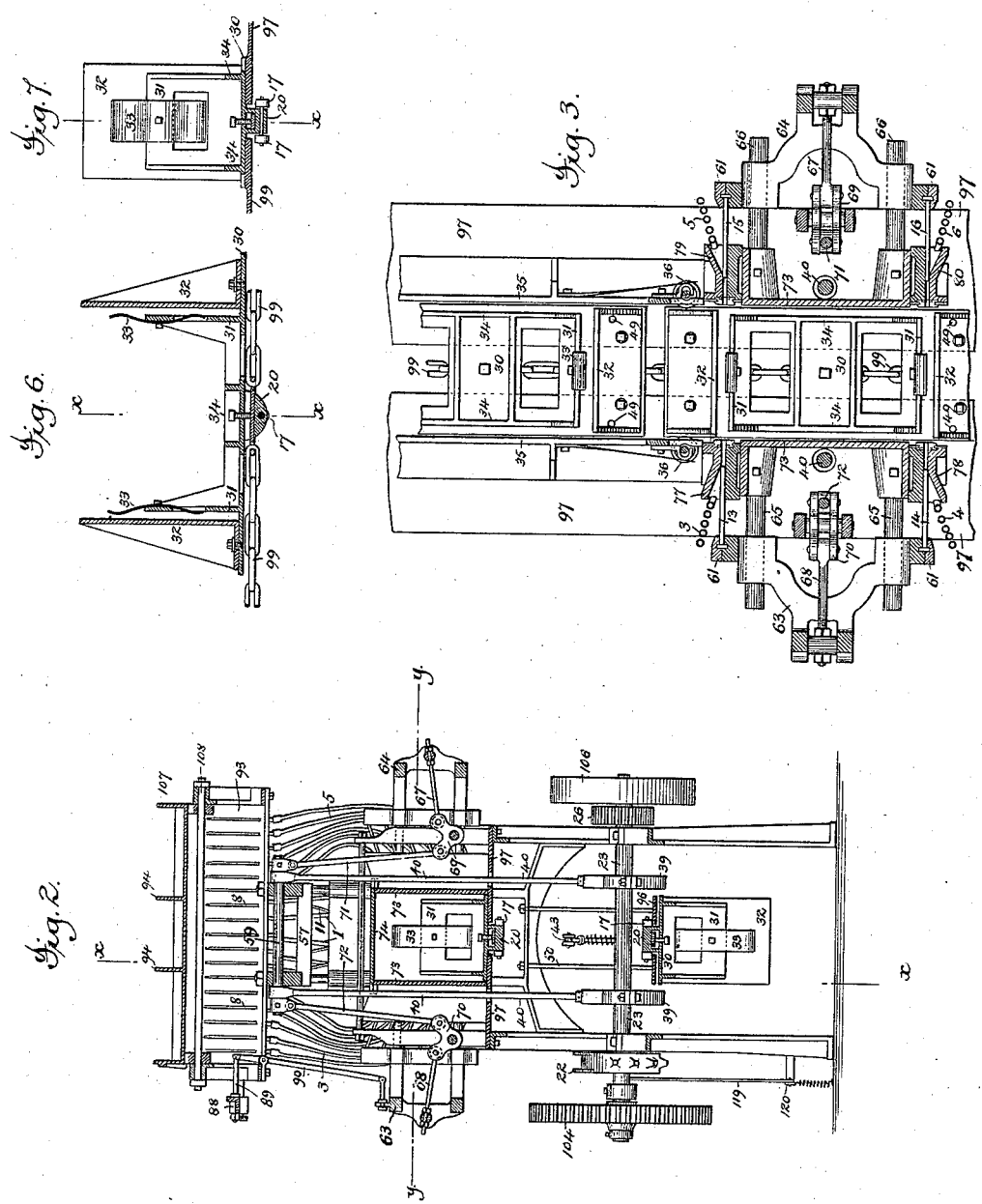

(No Model.)
J. H. FOSTER.
BOX NAILING MACHINE.
No. 309,297. Patented Dec. 16, 1884.
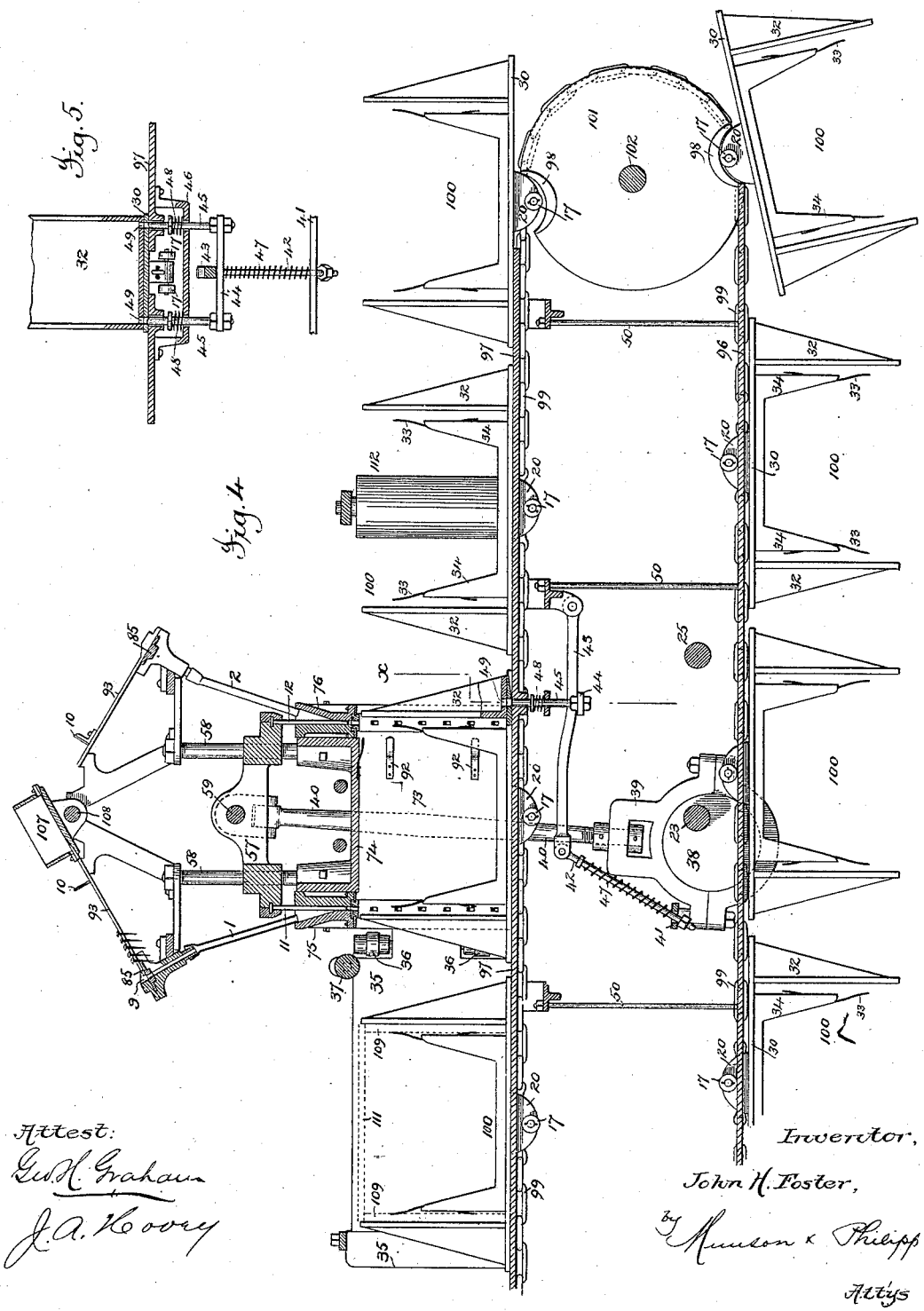

(No Model.)  
5 Sheets—Sheet 4.

J. H. FOSTER.
BOX NAILING MACHINE.

No. 309,297. Patented Dec. 16, 1884.

Attest:  
Geo. H. Graham  
J. A. Keovry

Inventor,  
John H. Foster,  
by Munson & Philipp  
Attys.

N. PETERS, Photo-Lithographer, Washington, D. C.

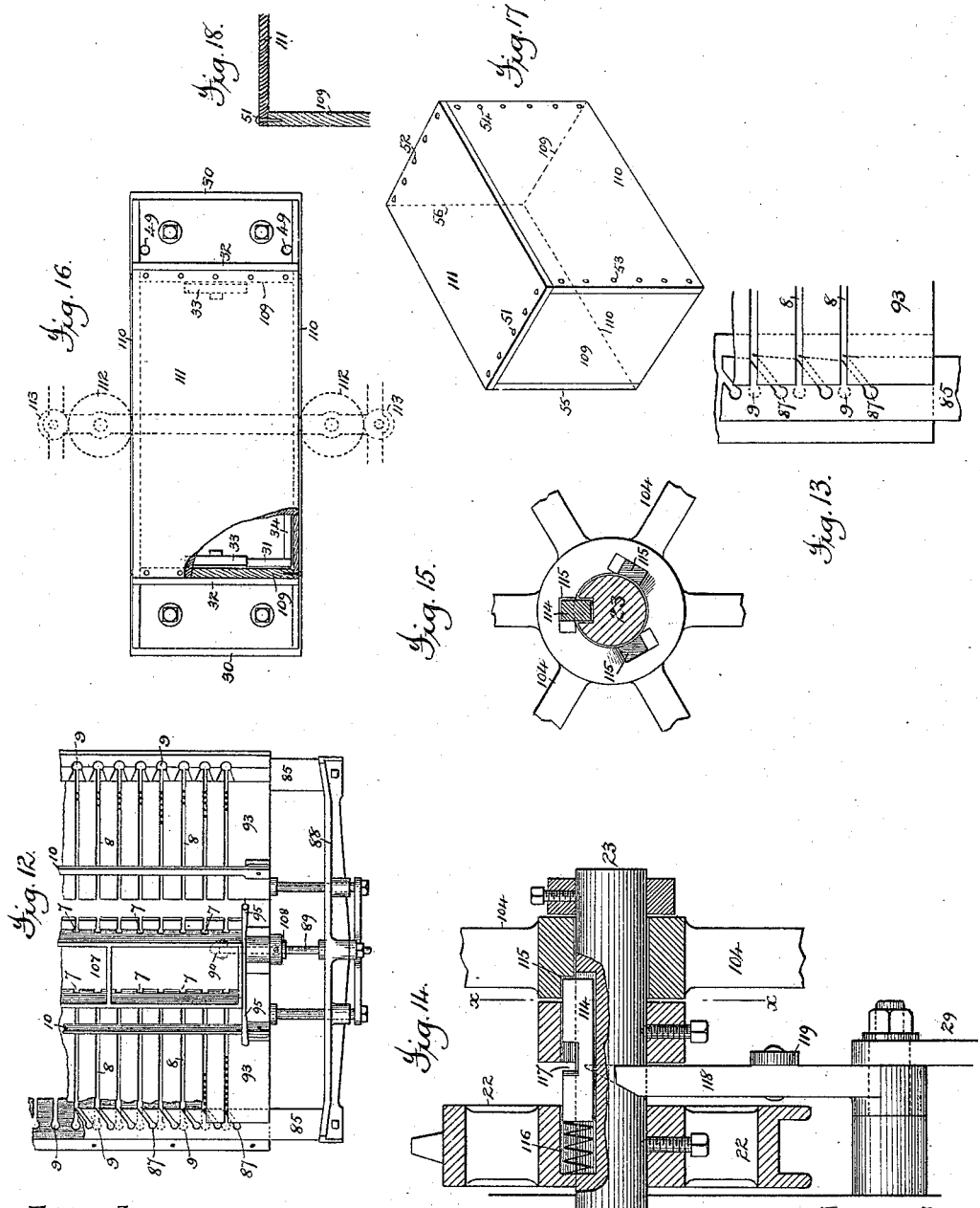

UNITED STATES PATENT OFFICE.

JOHN H. FOSTER, OF PLATTSBURG, NEW YORK, ASSIGNOR, BY DIRECT AND MESNE ASSIGNMENTS, TO THE EXCELSIOR BOX NAILING MACHINE COMPANY, OF BAYONNE, NEW JERSEY.

BOX-NAILING MACHINE.

SPECIFICATION forming part of Letters Patent No. 309,297, dated December 16, 1884.

Application filed September 12, 1883. (No model.)

*To all whom it may concern:*

Be it known that I, JOHN H. FOSTER, a citizen of the United States, residing in the city of Plattsburg, county of Clinton, and State of New York, have invented certain new and useful Improvements in Box-Making Machines, fully described and represented in the following specification and the accompanying drawings, forming a part of the same.

The present invention relates to the manufacture of ordinary rectangular wooden boxes, it being the object of the invention to produce a mechanism for this purpose which shall be automatic and continuous in its operation, and in which all the nails necessary for uniting the sides, ends, and bottom shall be driven at a single operation, thereby not only increasing the rapidity with which the mechanism can be made to operate, but avoiding the strain upon the material which results from nailing the several joints in succession.

The details in the construction and organization of the mechanism in which the invention is embodied will be hereinafter so fully explained and so particularly pointed out as to render any extended preliminary description unnecessary to an understanding of the invention.

In the accompanying drawings, Figure 1 is a side elevation of a box-nailing mechanism embodying the present invention. Fig. 2 is a transverse vertical section of the same. Fig. 3 is a partial horizontal section upon an enlarged scale, taken upon the line $y\ y$ of Fig. 2. Fig. 4 is a partial longitudinal vertical section upon the same scale as Fig. 3, taken upon the line $x\ x$ of Fig. 2. Fig. 5 is a sectional detail taken upon the line $x\ x$ of Fig. 4. Figs. 6 and 7 are sectional views of the "forms" in which the parts of the box are supported during the nailing, each being taken upon the line $x\ x$ of the other. Figs. 8, 9, 10, and 11 are details upon an enlarged scale, illustrating the construction and operation of the nail supporting and driving mechanism. Fig. 12 is a partial plan view of the nail-feeding mechanism. Fig. 13 is also a partial plan view of the same mechanism upon a greatly enlarged scale. Fig. 14 is a horizontal section taken upon the line $x\ x$ of Fig. 1, showing the mechanism for automatically arresting the operation of the machine. Fig. 15 is a vertical section taken upon the line $x\ x$ of Fig. 14. Fig. 16 is a plan view of one of the forms, showing the completed box in position, and also showing in dotted lines a printing mechanism for printing any desired matter upon the sides of the box as it leaves the nailing mechanism. Fig. 17 is a perspective view of the completed box; Fig. 18, a sectional detail of the same. Fig. 19 is a view of the under side of one of the forms for supporting the parts of the box in their assembled position, and Fig. 20 is a partial end view of the same.

Referring to said drawings, it is to be understood that the complete organization therein shown is made up of two substantially-distinct mechanisms, the function of the first being to receive and support the several pieces going to make up the box and present them in proper position to be united by the nailing mechanism, and then, after they have been so united, convey the complete box from the nailing mechanism and deliver it from the machine, while that of the second is to present and drive the nails in proper position to unite the several pieces of the box. These two mechanisms are driven from the same source of power, and are so timed that they will perform their several operations in proper succession and in such relation to each other as to make the operation of box-making practically continuous.

In order to arrive at an understanding of the construction and operation of the whole organization, the two mechanisms of which it is composed will first be described in the order in which they have been mentioned, after which their combined operation will be explained.

The first mechanism consists, essentially, of a number of forms, 100, which are attached at points near the centers of their bottoms to an endless chain, 99, so as to form an endless series. The endless chain 99, carrying the forms, is stretched around a pair of grooved wheels or pulleys, 101, mounted upon shafts 102, which are supported in suitable bearings in the frame-work at the opposite ends of the machine. The grooved pulleys 101 are of a circumference equal to the lengths of two forms, and are provided at opposite sides with semicircular recesses 98, which, as the wheels revolve, receive corresponding projections, 20, upon the bottoms of the forms, whereby the chain 99 is prevented from slipping over the surface of said pulleys and a positive feeding movement is given to the forms. The shafts 102 are each provided with a sprocket-wheel, 21, around which passes a drive-chain, 103, which also passes over and partially around a mutilated sprocket-wheel, 22, which is fast to a transverse shaft, 23. The shaft 23 is provided with a gear, 104, to which motion is communicated from a gear, 24, mounted upon a second transverse shaft, 25, the opposite end of which is provided with a gear, 105, which engages with a gear, 26, mounted loosely upon the shaft 23, and rigidly connected to the belt-pulley 106. The chain 103 is held in engagement with the mutilated sprocket-wheel 22 by means of a pulley, 27, mounted upon the shaft 25, and a pulley, 28, mounted upon a stud extending from a pivoted weighted lever, 29, all as shown in Fig. 1.

The bearings 19, in which the shafts 102 are supported, are made movable upon the frame of the machine, and are provided with adjusting-screws 18, by which, after the chains 99 103 have been placed upon the pulleys 101 and sprocket-wheels 21, they can be so adjusted as to bring said chains to the proper tension.

The forms 100, in which the several pieces composing the box are supported during the process of nailing, consist of a bed-plate, 30, of suitable size to support the box, which is to be formed and provided with upwardly-projecting arms or brackets 31 32, between which the end pieces for the box are placed, the arms 31 being provided with presser-springs 33, which will yield sufficiently to permit end boards of slightly-varying thicknesses to be received, and will hold such boards always pressed against the arms 32. The arms 32 are, as will be seen by reference to Fig. 6, secured to the bed-plate 30 by means of bolts, which pass through elongated openings in the arms, thereby making said arms capable of slight adjustment with relation to the arms 31, so that when boards which differ considerably in thickness are to be used the arms can be fixed in proper position to accommodate the same. The arms 31 are united at their ends by portions 34, which extend upward from the bed-plate 30 and support the inside of the side pieces for the box.

Although the construction just described is the best which I have yet devised for the forms 100, and has consequently been chosen for illustration in the present case, yet it will readily be seen that these forms may be varied in construction from that shown without departing from the principle of the invention. The springs 33 are not absolutely essential, and may in some cases be omitted. So, also, it is not absolutely necessary that the parts 32 should be adjustable. The forms may also be varied in other respects without departing from the invention, so long as a form is provided which is adapted to receive the parts of the box and support them in their assembled position during the nailing operation. As the forms are carried upward around the pulley 101, to be brought into position to receive the parts for forming the box, they pass onto a supporting bed-plate, 97, which extends between the pulleys 101 and supports the forms during the time the box is being formed. This bed-plate is divided in its center, so as to provide a longitudinal opening for the passage of the chain 99 and the projections 20 upon the bottoms of the forms. The bed-plate 97 is provided with upwardly-extending side pieces, 35, which are located just outside the edges of the bed-plates 30 of the forms, and which serve, in connection with the portions 34, to support the side-forming portions of the box until it has arrived at the nailing mechanism. The side pieces, 35, are provided with spring-pressed rollers 36 37, the purpose of which will hereinafter appear. The projections 20 upon the bed-plates 30 of the forms are provided on each side with small rollers 17, which, as the forms are carried downward around the pulley 101, pass above supporting-plates 96, suspended from rods 50, and support the weight of the forms as they are carried back to the opposite end of the machine. The shaft 23 is provided with a pair of eccentrics, 38, to the bands 39 of which are connected a pair of rods, 40, which operate the nailing mechanism, in a manner which will hereinafter appear. The eccentric-bands 39 are connected by a cross-bar, 41, which, through a link, 42, and a pivoted lever, 43, operates a second cross-bar, 44, to the ends of which are secured a pair of vertically-working locking-bolts, 45, which pass through openings in a bracket, 46, and the bed-plate 97, as shown in Figs. 4 and 5. The link 42 and the bolts 45 are provided with springs 47 48, the tendency of which is to hold said link and bolts in their raised positions. The forward end of the bed-plates 30 of the forms are provided upon their under sides with beveled channels, as shown in Figs. 4, 19, and 20, so as to pass above and press downward the locking-bolts 45, and are provided with openings 49, into which the locking-bolts are thrown by their springs 48, so as to arrest and hold the forms in exactly the proper position with relation to the nailing mechanism. The sprocket-wheel 22 is so proportioned that during each revolution it will advance the chain 99 a distance equal to the length of one form, and the parts are so timed that the bolts 45 will arrest and lock the form just before the last tooth of the wheel 22 passes out of engagement with the chain 103. As soon as the form is thus locked, the strain upon the chain will raise the weighted pulley 28, so as to slacken the chain and allow said tooth to pass out of engagement therewith. While the blank part of the wheel 22 is in contact with the chain 103 the form will remain at rest, and during this period the nailing takes place. The eccentrics 38 are so timed as to withdraw the bolts 45 just before the first tooth of the sprocket-wheel 22 comes into engagement with the chain 103.

The second mechanism—that for supplying and presenting the nails in proper position and for driving them—consists, essentially, of a reservoir or hopper, means for taking the nails from this hopper and conveying them as they are required to the driving mechanism, and a driving mechanism consisting of a number of series of plungers arranged to act simultaneously to drive all the lines of nails required to unite the ends, sides, and bottom of the box.

The reservoir or hopper from which the nails are supplied to the driving mechanism consists of a rectangular box, 107, the opposite sides of which are provided along their lower edges with a series of feeding-openings, 7, corresponding in number with the whole number of nail-driving plungers. This hopper is mounted upon a rock-shaft, 108, and is provided with means, as one or more handles, 95, by which it can be rocked from side to side, so as to shake the nails and cause them to pass out through the opposite openings. This rocking of the hopper may be effected automatically by suitable connections with some moving part of the apparatus, or it may be done by an attendant. The bottom of the hopper is provided with shallow grooves or recesses leading to the openings 7, which aid in causing the nails to assume a position crosswise of the hopper, so that they will readily pass through said openings as the hopper is rocked. The hopper will preferably be provided with a number of cross-partitions, as 94, by which it will be divided into several separate compartments, so that nails of different lengths or quality may be supplied to the different plungers, if desired.

Figure 9:
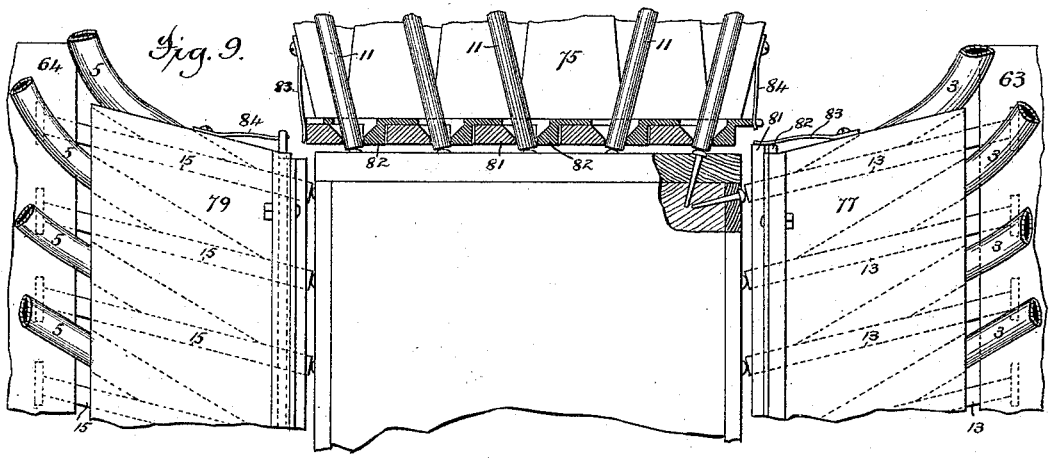
Figure 10:
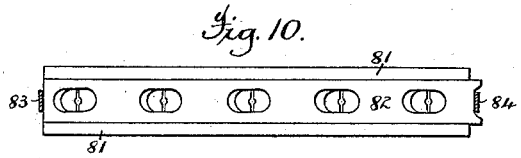
Figure 11:
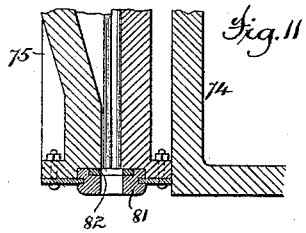

Arranged upon each side of the hopper 107, and in such position that their upper edges will coincide with the bottom of said hopper when the same is inclined in either direction, are a pair of inclined plates, 93, in which are series of slots, 8, corresponding in number to the feed-openings 7 in the sides of the hopper, said slots being of sufficient width to receive the bodies of the nails, but not their heads, so that as the nails pass through the feed-openings their bodies will drop through the slots 8, and they will gravitate downward along said slots suspended by their heads. The plates 93 are each provided with a ledge, 10, which is sufficiently raised above said plate to allow the heads of the nails to pass freely beneath it when they are in proper position in the slots 8, but is sufficiently near to said plate to arrest any nails which do not properly fall into the slots, from which position such nails can readily be restored to the hopper by the attendant. The slots 8 in the plates 93 terminate in openings 9, which are of sufficient size to allow the heads of the nails to pass through them, and are located directly above a corresponding number of conveying-tubes, which are divided into six series, 1 2 3 4 5 6, for conveying the nails to and presenting them in front of the six series of plungers 11 12 13 14 15 16, for driving the six rows of nails 51 52 53 54 55 56, which unite the sides and ends to each other and to the bottom of the box. The series of tubes 1 2 lead directly downward and inward from the central portions of the openings 9 upon the opposite sides of the hopper to the series of plungers 11 12, which drive the rows of nails 51 52, for uniting the bottom of the box to the ends, as shown in Figs. 1, 2, 4, 8, and 17. The series of tubes 3 4 lead from the openings 9 upon the opposite sides of the hopper at the left side of the machine, looking from the delivery end, and, passing downward, curve inward to the series of laterally-reciprocating plungers 13 14, which drive the rows of nails 53 54, for uniting one of the sides of the box to the ends, as shown in Figs. 1, 2, 3, 9, and 17. The series of tubes 5 6 lead from the openings 9 upon the opposite sides of the hopper at the right of the machine, looking from the delivery end, and, passing downward, curve inward to the series of laterally-reciprocating plungers 15 16, which drive the rows of nails 55 56, for uniting the other side of the box to the ends, as shown in Figs. 2, 3, 9, and 17. The plungers 11 12, which drive the rows of nails 51 52, are mounted in a reciprocating head, 57, which moves upon four vertical guide-rods, 58, and is provided with a cross-shaft, 59, to which are connected the rods 40, before referred to, as shown in Figs 2 and 4. Each of the series of plungers 11 12 consists of five plungers, said plungers being arranged obliquely, so as to give a corresponding direction to the nails which they drive, (see Figs. 2, 8, and 9,) thereby giving said nails a greater hold upon the wood and correspondingly increasing the strength of the box. To permit the plungers to have this direction of motion, they are loosely mounted in the head 57, so as to be capable of lateral movement in said head as it is raised and lowered. To effect this each plunger is provided with a flat head, 60, which rests in a recess, 62, formed between the body of the head 57 and a clamping-piece, 61, bolted to said head, as shown in Fig. 8. By this construction it will be seen that as the plungers are forced downward by the head 57 their heads 60 will move along the recess 62, so as to readily accommodate themselves to the changed position which their oblique arrangement requires them to take, as indicated by the dotted lines in said figure. The plungers 13 14 15 16, which drive the rows of nails 53 54 55 56, are mounted in laterally-reciprocating heads 63 64, which move upon guide-rods 65 66, and are operated by rods 67 68, bell-crank levers 69 70, and rods 71 72 from the shaft 59 of the head 57, as shown in Fig. 2. Each of these series, as shown in the present case, consists of six plungers, which, as in the case of series 11 12, are arranged obliquely, and are secured to their operating-heads, so as to be capable of lateral movement therein in the manner already described, as shown in Fig. 9.

The bed-plate 97, in addition to the devices already described, is provided with a pair of upwardly-extending plates or supports, 73, which form continuations of the plates 35, and also form supports for the guide-rods 65 66, and for a cross-plate, 74, which supports the guide-rods 58.

To the ends of the plates 73 74 there are secured blocks 75 76 77 78 79 80, in which are formed guideways for the inner ends of the driving-plungers, and also openings which communicate with the series of tubes 1 2 3 4 5 6, and through which the nails pass to position in front of the plungers.

To prevent the nails from coming into contact with the box, and to hold them in readiness to be operated upon by the plungers at the proper time, the inner ends of the openings in the blocks 75, &c., are closed by yielding jaws, which arrest and hold the nails until acted upon by the plungers, when they yield so as to permit the nails and plungers to pass and again automatically close upon the withdrawal of the plungers. These jaws are formed of two plates, 81 82, which slide in opposite directions, and are controlled by springs 83 84. The plates 81 are held to slide in guideways on the under sides of the blocks 75, &c., and are provided with openings which allow the passage of the nail and plunger, one end of which openings forms one member of the jaws, the other member of said jaws being formed by the projecting portions of the plate 82, which latter plate slides in a recess formed in the plate 81. The two members of the jaws are beveled, as shown in Figs. 8 and 9, so that they will be readily forced apart against the resistance of the springs 83 84 by the action of the plungers.

In order that only a single nail may be presented in front of each plunger at a time, and that such nail shall be presented when the plunger is in its retracted position, the plates 93 are provided with a cut-off mechanism, by which, at each operation of the driving mechanism, one nail is separated from the line of nails in each slot and allowed to drop into its guiding-tube, to be conveyed to the corresponding plunger, while the remaining nails in each line are arrested. This mechanism consists of a pair of plates, 85, which lie beneath the lower ends of the plates 93, and are provided with oblique slots, which terminate in enlarged openings 87, as shown in Figs. 12 and 13. The plates 85 are connected by a cross-bar, 88, and receive a reciprocating motion through a link, 89, and a pivoted lever, 90, which is connected to the plunger-head 64. By this connection it will be seen that as the head 64 returns to its outer position after performing each nailing operation the plates 85 will be moved inward, so as to cut one nail from the row in each slot and carry it downward, so as to allow it to drop through the coinciding openings 87 9 and pass into its guiding-tube, while the remainder of the row is arrested.

The operation of the mechanisms just described is as follows: The machine being set in motion, the forms 100 will be carried upward around the pulley 101, as shown in Fig. 1, their rear ends being acted upon by the springs 91, so as to tilt their forward ends over onto the plate 97. As the forms pass forward toward the nailing mechanism, the attendant or attendants will first insert the end pieces, 109, between the arms 31 32, after which, as the forms pass between the side plates, 35, the side pieces, 110, will be inserted between said plates and the supports 34, and the bottom piece, 111, will be then placed in position over the sides and ends. As the form carrying the parts thus assembled nears the nailing mechanism, the spring-pressed rollers 36 37 will press the side and bottom pieces snugly against the end pieces, in which position they will enter between the plates 73 and beneath the plate 74. As the first form arrives in position for the nailing mechanism to operate, the bolts 45 will be pressed into the openings 49 and lock the form, and the teeth of the sprocket-wheel 22 will pass out of engagement with the drive-chain 103, as already described, so as to no longer drive the chain 99. While in this position the side pieces of the box will be held snugly against the end pieces by the action of the springs 92.

During the operation just described the eccentrics 38 will, through the rods 40 71 72, raise the head 57 and throw the heads 63 64 outward, so as to withdraw all of the plungers to their retracted positions, as shown in Fig. 8, and at the same time move the plates 85 inward, so as to allow one nail from each of the slots 8 to pass through the openings 87 9 and enter the corresponding conveying-tubes, through which tubes they will fall and be arrested by the jaws of the plates 81 82 in front of the plungers of the several series, as indicated in Fig. 8. As soon as the form containing the assembled parts has been arrested in position for the nailing operation the eccentrics 38 will, through the connections just described, commence to draw the heads 57 downward and the heads 63 64 inward, thereby forcing the several series of plungers simultaneously inward between the jaws of the plates 81 82, as shown in Fig. 9, and driving the corresponding rows of nails to unite the sides, ends, and bottom of the box, as shown in Figs. 16 and 17. As soon as the plungers have advanced far enough to start the nails well into the wood the continued revolution of the eccentrics 38 will rock the lever 43, so as to withdraw the bolts 45 and release the form, as shown in Fig. 4. Shortly after the plungers commence their return movement the teeth of the sprocket-wheel 22 will again come into engagement with the drive-chain 103, so as to start the chain 99 and carry the form holding the now completed box out from between the plates 73, and at the same time advance the next succeeding form, holding the pieces for another box into position between said plates, where it will be arrested, as already described. As the second form is advanced into position between the plates 73 the plungers will be withdrawn to their extreme retracted positions, thereby allowing the jaws of the plates 81 82 to be closed by the springs 83 84, and operating the plates 85 so as to allow a fresh series of nails to fall to position in front of the plungers, and so the operation will continue to be repeated, one box being completed at each revolution of the sprocket-wheel 22. It is of course to be understood that during the operations just described the hopper 107 will be rocked, either automatically or by the attendant, so as to keep all of the slots 8 in the plates 93 supplied with nails. As the forms pass downward around the pulley 101 the completed boxes will be removed either by an attendant or by means of an automatic discharging apparatus, which may readily be provided for that purpose. It will of course be seen that a part of the nail-driving plungers may be thrown out of operation if at any time it should be desired to use less than the whole number—as, for example, if it should be desired to simply unite the side and end pieces, the plungers 11 12 can be removed; or, if it should be desired to nail the bottom onto side and end pieces which have been previously united, the rods 67 68 may be disconnected from the parts 64 65, so that the plungers 13 14 15 16 will remain idle. By disconnecting the rods 67 68 in this manner, the machine may also be used to nail the covers onto boxes which have been previously made. If it is desired to capacitate the machine for this work, however, the forms must be slightly modified in construction, so as to receive the box. This can be done by simply making the parts 31 34 capable of removal from the part 30.

If it should be desired to place any printed matter upon the sides of the boxes, it may readily be done by means of one or more vertical printing-rolls, as 112, which are mounted in suitable bearings rising from the bed-plate 97, and so positioned as to come into printing contact with the sides of the boxes as they pass forward from the nailing mechanism. The printing-rolls 112 will of course be provided with a suitable inking mechanism, represented in the present case by the rolls 113.

In a machine of the character of that herein shown it is of course desirable, in order to prevent danger of breakage, to provide means by which it can be instantly arrested in case any of the parts fail to work properly. To provide for this, the gear 104 is mounted loosely upon the shaft 23, and is connected thereto by a sliding spline, 114, which rests in a groove in the shaft, and is arranged to enter either one of a series of recesses, 115, formed in the hub of the gear, as shown in Figs. 14 and 15. The spline 114 is provided with a spring, 116, the tendency of which is to press the spline outward, so that it will enter one of the recesses 115 and lock the shaft and wheel together. The spline 114 is provided upon its outer edge with a recess, 117, the inner wall of which, as the shaft 23 revolves, will be brought into engagement with the beveled end of a pivoted lever, 118, which normally rests upon the top of said shaft, thereby forcing said spline inward, so as to withdraw its end from the recess 115, in which it is resting, and disconnect the shaft 23 from the gear 104. The lever 118 is connected by a link, 119, to one end of a lever, 120, the opposite end of which is connected to a push-rod, 121, which terminates near the nailing mechanism.

When it is desired to start the machine, the attendant places his foot upon the rod 121, and thereby raises the lever 118 out of the recess 117 and away from the shaft 23. The spring 116 will then force the spline 114 against the hub of the gear 104 and cause it to enter the first one of the series of recesses 115 which is presented, so as to connect the gear 104 to the shaft 23, and set the machine in motion. As long as the rod 121 remains depressed the lever 118 will be held in its raised position and the machine will continue in motion.

When it is desired to stop the machine, the attendant simply removes his foot from the rod 121, and thereby allows the end of the lever 118 to fall onto the shaft 23, so that as soon as the spline 114 comes to the top of the shaft it will be withdrawn from the recess 115 and the machine arrested.

What I claim is—

1. In a box-making machine, the combination, with the form or support constructed and arranged to hold the sides, ends, and bottom of the box in their assembled position, of nail-driving mechanism constructed and arranged substantially as described, and capacitated to simultaneously drive of all the nails required to unite said parts.

2. In a box-making machine, the combination, with the form or support constructed and arranged to hold the sides, ends, and bottom of the box in their assembled position, of nail-driving mechanism constructed and arranged substantially as described, and capacitated to simultaneously drive all of the nails required to unite said parts and complete the box, and nail-feeding mechanism, substantially such as described, which is capacitated to supply the nails in proper position to said driving mechanism.

3. In a box-making machine, the combination, with the movable form or support constructed and arranged to receive and hold the parts of the box in their assembled position, and to then present said assembled parts in proper position to the nailing mechanism, of a nail-driving mechanism constructed and arranged substantially as described, and capacitated to simultaneously drive all of the nails required to unite said parts and complete the box, and a nail-feeding mechanism which is capacitated to supply the nails in proper order and position to said driving mechanism.

4. In a box-making machine, the combination, with the movable form or support constructed and arranged to receive and hold the parts of the box in their assembled position, present said assembled parts in proper position to the nailing mechanism, and remove the completed box therefrom, of a nail-driving mechanism constructed and arranged substantially as described, and capacitated to simultaneously drive all of the nails required to unite said parts and complete the box, and a nail-feeding mechanism, substantially such as described, which is capacitated to supply the nails in proper order and position to said driving mechanism.

5. In a box-making machine, the combination, with the movable form or support constructed and arranged to receive and hold the parts of the box in their assembled position, present said assembled parts in proper position to the nailing mechanism, and remove the completed box therefrom, of a nail-driving mechanism constructed and arranged substantially as described, and capacitated to simultaneously drive all of the nails required to unite said parts and complete the box, a nail-feeding mechanism, substantially such as described, which is capacitated to supply the nails in proper order and position to said driving mechanism, and a printing mechanism, substantially such as described, arranged to act upon the completed box as it passes from the nailing mechanism.

6. In a box-making machine, the combination, with the forms or supports 100, constructed and arranged to receive and hold the parts of the box in their assembled position, and connected to each other so as to form an endless series, of mechanism for moving said series so as to bring said forms successively to the nailing mechanism, substantially as described.

7. In a box-making machine, the combination, with the forms or supports 100, constructed and arranged to receive and hold the parts of the box in their assembled position, and connected to each other so as to form an endless series, of mechanism for moving said series so as to bring said forms successively to the nailing mechanism, and means, substantially such as described, for arresting said series as each form arrives in proper position for the nailing operation, substantially as described.

8. In a box-making machine, the combination, with the forms or supports 100, constructed and arranged to receive and hold the parts of the box in their assembled position, and connected to each other so as to form an endless series, of mechanism for moving said series so as to bring said forms successively to the nailing mechanism, means, substantially such as described, for arresting said series as each form arrives in proper position for the nailing operation, and a nail-driving mechanism, substantially as described, which is capacitated to simultaneously drive all of the nails required to unite said parts and complete the box.

9. The combination, with the series of forms 100, of means for advancing the same with a step-by-step movement, and the locking-bolts 45, for arresting the same at the proper points, substantially as described.

10. The combination, with the series of forms 100, of the drive-chain 103, mutilated sprocket-wheel 22, and the locking-bolts 45, substantially as described.

11. The combination, with the series of forms 100, provided with projections, as 20, and rolls, as 17, of the bed-plate 97 and the supporting-plates 96, substantially as described.

12. The combination, with a form, as 100, adapted to support the parts of a box in their assembled position, of a number of series of plungers, as 11 12 13, &c., arranged to drive the several rows of nails required to unite the parts and complete the box, and means for simultaneously operating all of said series of plungers, substantially as described.

13. The combination, with a form, as 100, adapted to support the parts of a box in their assembled position, of a number of series of plungers, as 11 12 13, &c., arranged to drive the several rows of nails required to unite the parts and complete the box, means for presenting the required nails in front of said plungers, and means for simultaneously operating all of said series of plungers, substantially as described.

14. The combination, with means for supporting the parts of a box in their assembled position, of a number of series of plungers, as 11 12 13, &c., arranged to act at or substantially at right angles to each other, substantially as described.

15. The combination, with means for supporting the parts of a box in their assembled position, of a number of series of plungers, as 11 12 13, &c., arranged to act at or substantially at right angles to each other, and means for presenting the required nails in proper position in front of said plungers, substantially as described.

16. In a nail-driving mechanism, the combination, with a reciprocating head, as 57, provided with a series of plungers, as 11, of a block, as 75, provided with a series of guideways for said plungers, and with yielding sliding jaws for closing said ways, substantially as described.

17. In a nail-feeding mechanism, the combination, with a rocking hopper, as 107, of a pair of inclined slotted plates, as 93, provided with a cut-off mechanism, as 85 86, substantially as described.

18. In a nail-feeding mechanism, a rocking hopper, as 107, provided with nail-feeding openings at both its sides, substantially as described.

In testimony whereof I have hereunto set my hand in the presence of two subscribing witnesses.

JOHN H. FOSTER.

Witnesses:
   JAS. A. HOVEY,
   A. N. JASBERA.